SELF-SEARCHING MEMORY

Original Filed Dec. 16, 1960 3 Sheets-Sheet 1

PAUL M. DAVIES
INVENTOR.

BY George C. Thompson
Gerald Grigly
AGENTS

SELF-SEARCHING MEMORY

Original Filed Dec. 16, 1960 3 Sheets-Sheet 2

PAUL M. DAVIES
INVENTOR.

BY George C. Thompson

AGENTS:

Jan. 3, 1967 P. M. DAVIES 3,296,599

SELF-SEARCHING MEMORY

Original Filed Dec. 16, 1960 3 Sheets-Sheet 3

PAUL M. DAVIES
INVENTOR.

BY George C. Thompson
Gerald Levy
AGENTS.

United States Patent Office
3,296,599
Patented Jan. 3, 1967

3,296,599
SELF-SEARCHING MEMORY

Paul M. Davies, Manhattan Beach, Calif., assignor, by mesne assignments, to TRW Inc., a corporation of Ohio Original application Dec. 16, 1960, Ser. No. 76,368. Divided and this application Jan. 2, 1962, Ser. No. 163,391
6 Claims. (Cl. 340—173.1)

This invention relates to a memory storage system and more particularly to a self searching memory in which information may be stored and retrieved without the need of specifying an address. This application is a division of co-pending application, Serial No. 76,368, filed December 16, 1960 now abandoned.

In some prior art memory systems memory cells may be assigned consecutive numbers which serve as addresses. In order to write a record into such a memory the address of an empty cell must first be specified. The system decodes this address, which is then used to obtain access to the specific memory cell corresponding to the specified address. In magnetic tape memory systems a count-up or count-down addressing system is used in which the tape is read and the cells counted until the specified cell is reached. In core memory systems the specified address controls switching matrices which select the proper memory cell. In all the prior art systems the address of an empty cell must be known beforehand or, in lieu of this, a sequential search must be made in order to find an empty cell which must then be suitably identified. In order to retrieve information already stored in conventional memory systems it is necessary to either specify the address, which must then be decoded, or a search must be made to find the desired memory cell on the basis of information contained in the record itself. In many applications such a search would require on the average half as many read operations as there are cells in the memory, thereby making such an operation prohibitively expensive and time consuming.

In this invention, as presumably in the case of the human brain, information is stored in a memory cell without specifying a particular memory address. It is required only that at least one memory cell be empty for the information to be recorded. Further, it is not necessary to know which memory cells are full and which memory cells are empty, provided only that a memory cell is available to receive the information to be stored. A reading of information is achieved by specifying key information which is carried as part of the stored record and which uniquely defines the stored record. When this key information is specified, a simultaneous search is made in all memory cells and the stored record with the matching key information is automatically read-out, there being no requirement to know exactly in which memory cell the information was stored.

Details of the circuitry for selecting the defined first memory cell are more fully described in copending application Serial No. 76,182, now Patent No. 3,243,786, entitled "Memory Cell Selecting Means." Details of the comparing circuitry for selecting a record are more fully described in copending application Serial No. 76,393, entitled "Equivalence Circuit Comparing Means," filed Dec. 10, 1961.

In the performance of this invention it will be pointed out how cryogenic devices are particularly suited for performing the functions of the self searching memory device due to the infinite ratio of ON resistance (resistive state) to OFF resistance (super-conductive state) thereby permitting complex networks with no attenuation of signal.

Further objects and advantages will be made more apparent as the description progresses, reference now being made to the accompanying drawings wherein.

In order to explain more fully the advantages to be obtained from the present invention, it is though best at this time to elaborate on the desired functional cooperation of the elements comprising the disclosed device and leave for a later part of the specification the actual disclosure and operation of the individual components.

Figure 1:
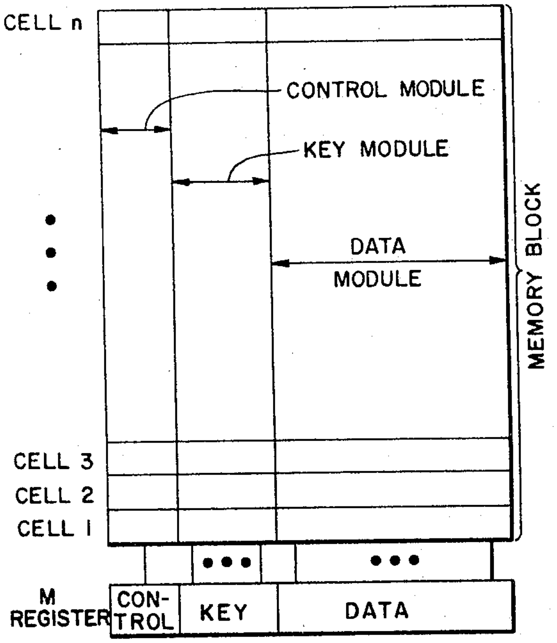
FIG. 1 is a block diagram of a memory storage device.

Referring now to FIG. 1, there is shown a memory block comprising a plurality of individual memory cells each having the capacity to store a complete record. Each memory cell is divided into three parts identified as a control module, a key module, and a data module. Cooperating with the memory block is a single M register for communicating with the individual modules of the memory cells. The vertical lines from the individual modules of the M register interconnect all the memory cells of the memory block and are used to transfer a record to and from the M register and the individual cells of the memory block.

The operation of the memory device will be more apparent by considering a writing operating in which information is caused to transfer from the M register to a memory cell in the memory block. To write information, it is necessary to place a record which includes both key and data information in the M register in the appropriate key and data module portions. The control module of the M register is then caused to generate control pulses which are directed via the vertical lines associated with all of the individual control modules of all the memory cells, to each control module. Each control module of each memory cell contains a "busy" flip-flop circuit which indicates if that particular memory cell is empty or full of record information. The control pulses generated by the control module of the M register interrogate all busy flip-flops, and by means of logic circuits in every control module the first empty memory cell starting from the M register is selected. Having located the first empty cell, the record information in the M register is transferred into the selected memory cell along the vertical lines interconnecting all key modules and all data modules. Once the memory cell is loaded with record information, the busy flip-flop of that memory cell is then turned ON to indicate the memory cell is full.

In order to read-out a specified record contained in a full memory cell, it is necessary to place the key information that uniquely identifies said record in the key module of the M register. The control module of the M register is caused to generate a read-out command signal which, together with the key now located in the key module of the M register, is sent to all memory cells in the memory block. The key information located in the key module of the M register is transmitted to all memory cells simultaneously and compared with the key information stored in the individual memory cells. Each key module of every memory cell is arranged to continuously compare new information with previously stored information, and in response thereto to generate either a true compared signal or a false compared signal. Since the key information is unique, only one memory cell will have a true compared signal while all others will have a false compared signal. The compared signal from each key module is directed to the control module associated therewith. The false compared signals are all bypassed to ground, whereas the one true compared signal is controlled by the read-out command signal and directed to the associated data module thereby causing said data module to read-out the stored information along the vertical lines. It can be seen, therefore, that all memory cells are inerrogated simultaneously and that the logic circuits associated with the memory cells themselves and in cooperation with the M register will produce desired read-out information in the data module of the M register.

An important feature of each memory cell is the ability to clear an individual memory cell by simply turning OFF the busy flip-flop in the control module. In operation, clearing is accomplished by placing the key information corresponding to the particular data to be cleared in the M register. A clear control command signal is generated in the control module of the M register, and in a similar manner, as described for the read-out operation, the individual key modules are interrogated. The true compared signal generated in the selected key module then cooperates with the clear control command signal in the selected control module by turning the busy flip-flop in that control module into an OFF condition.

Another desirable property of the disclosed memory system is the ability to mask key information. For example, portions of the key information that are masked will be ignored when being compared with portions of the key module associated with the individual memory cell. The masking of portions of the key information is applicable to those cases in which more key information is available than is actually needed to uniquely define a record. In such systems, it will be possible to use subkey information to specify the desired record as long as the subkey information used contains enough information to uniquely define the record. Thus, records can be crossfiled under many key headings and retrieved instantaneously on the basis of any subkey heading. It is envisioned also that a memory system may be used to store the entire record in both the key module and the data module portions, thus allowing any item of information in the record itself to be used as a key to identify the record and read it out. Since clearing is accomplished by turning OFF the busy flip-flop, it is possible to clear a plurality of memory cells on the basis of a non-unique key provided the key information not used is properly masked. This will allow obsolete records identified in part by similar key information to be cleared from the system.

The advantages of the present invention will be made more apparent by considering an example of records being stored for a motor vehicle registry office using filing cards. The individual records may be uniquely defined in terms of license plate number, engine number, body number, or name and address of owner. Obviously a card index may be set up for any preferred heading; however, each heading would require either duplicate cards or crossfiling techniques to locate the actual information card. In the present invention any information that uniquely defines the vehicle or owner may be used as a key, since all the information will be recorded in the key and data modules. The masking techniques previously described allow flexibilty in locating a record, since any key information may be used provided only that it uniquely defines the record.

The suitability of utilizing cryogenic devices in the self searching memory will now be described by considering the nature of the individual components and the functions they must perform. The essential idea of the self searching memory is the use of logic in each memory cell to make the specific selection, whether it be for reading, writing, or clearing. This logic must be performed simultaneously in all cells of the memory if the desired increase in searching speed is to be realized. Of necessity, the circuitry must be complicated, since in the writing operation it is necessary to form a decision at each memory cell that is a function of the busy flip-flops of all previous cells, before it is possible to select the first empty cell. The adaptability of cryogenic devices to this memory system is due mainly to the ability of a gate element to be switched from a superconductive state to a resistive state by the application of a suitable current in a control element held in flux linking relationship with said gate element.

Superconductivity as used in the present invention is the apparent disappearance of electrical resistance at temperatures close to absolute zero. In the study of classical electromagnetism it was expected and predicted that the resistance of an electrical conductor would decrease with a decrease in temperature. The theory indicated that an electric current through a conductor, which consists of the flow of free electrons through the crystal lattice of the molecules forming the conductor, would be affected by the thermal vibration of the atoms comprising the lattice structure. This seemed to indicate that at the higher temperatures the greater thermal activity would increase the probability of collisions between electrons, and hence result in a higher resistivity. Conversely, at the lower temperature it was expected that the lower thermal activity of the electrons would result in a lowering of the resistance until some finite value was reached. This expected finite value was thought to consist of collisions between the moving electrons forming the electric current flow with the substantially fixed and immobile electrons forming the lattice structure. In addition, it was expected that defects and impurities in the lattice structure would also tend to establish a finite resistance near absolute zero. At 4.2 degrees absolute, the electrical resistance of mercury is known to vanish without even the residual resistance as predicted by the classical theory. For those materials exhibiting superconductivity, the change between the normal conductive state and the superconductive state is very abrupt and occurs at a specific temperature which is different for different materials. The temperature at which the material changes state is termed the transition temperature and is generally only a few degrees above absolute zero. A discussion of the principles of superconductivity and a general listing of materials and compounds that exhibit the property of superconductivity may be found in a book entitled "Superconductivity" by D. Schoenberg, Cambridge University Press, Cambridge, England, 1952. Certain materials capable of becoming superconductive and their transition temperatures are listed below:

| | ° K. |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

The above-listed transition temperatures apply only when the materials are in a substantially zero magnetic field.

In each material the field strength required to switch the state of the conductor varies with temperature within the range in which the material is superconductive. For example, the metal niobium has a transition temperature of 8 degrees Kelvin at zero field strength, a critical field strength of 2000 oersteds at 4.2 degrees Kelvin, and a critical field strength of 2400 oersteds at 1 degree Kelvin. These field strengths are determined to a large degree by the purity of the material, the mechanical stresses, and upon the general orientation or configuration of the specimen being tested. In certain configurations niobium has been found to have a critical field strength as high as 4000 oersteds at approximately 1 degree Kelvin temperature. At the present time, a popular theory explaining the phenomenon of superconductivity is that a fraction of the total population of current carrying electrons is paired in the sense that the resistance set up by the collision of one electron is precisely offset by the rebound of its partner from a simultaneous collision, so that no net resistance to the current is set up. At temperatures above the transition point or in magnetic fields of greater than critical strength these electrons become unpaired and their collisions are no longer self-canceling, but additive, and hence electrical resistance is restored.

The crossed film gate is constructed of a gate element crossed by one or more control elements that are separated from each other and from the gate element. The control elements may be constructed of lead wires separated from each other wherein the magnetic field of each separately controls the switching of the gate element. In operation, the complete device is immersed in a cryostat for maintaining a temperature that is lower than the critical transition temperature of the gate element. The cryostat may consist of a suitable container for holding the cryogenic materials in a liquid helium bath. The more detailed cryostat utilizing a double walled container in which the inner container holds the element in contact with the cryogenic materials and the outer walls hold a source of liquid nitrogen is fully described in a U.S. Patent 2,832,897 issued on April 29, 1958, to Dudley A. Buck. For the embodiment described the gate element may be constructed of tin, which has a critical temperature of 3.7 degrees Kelvin. The control elements may be constructed of lead wires and have a critical temperature of approximately 7.2 degrees Kelvin, which is substantially higher than the temperature of the cryostat.

Figure 2:
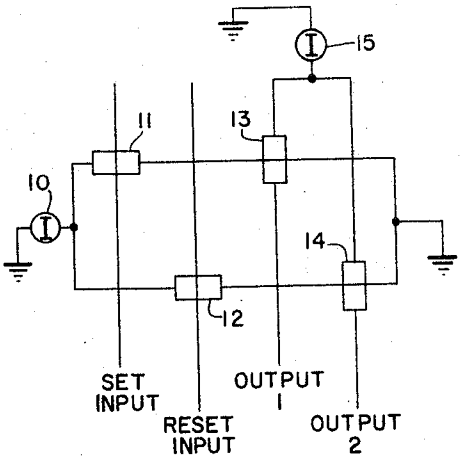
FIG. 2 is a schematic diagram of a cross film flip-flop circuit.

Referring now to FIG. 2, there is shown a flip-flop circuit composed entirely of crossed film cryogenic devices. A current source 10 supplies a parallel circuit consisting of the gate element of device 11 and the gate element of device 12. Each of said gate elements is connected respectively to a control element of device 13 and a control element of device 14. The control elements of both devices 13 and 14 are connected together and form the return current path for the current source 10. As illustrated, device 11 contains a control element having an input labeled "Set Input." The gate element of device 13 is labeled Output 1, whereas the gate element of device 14 is labeled Output 2. A current source 15 supplies the necessary operating current for the gate elements associated with devices 13 and 14. In actual practice, a single current source for 10 and 15 would be used, however for simplicity of explanation, separate current sources are illustrated. In considering the operation of the device, a signal identified as the Set Input is applied to the control element of device 11 for switching the gate element of said device from a superconductive to a resistive state. Distribution of current from current source 10 is forced to follow the superconductive path consisting of the gate element of device 12 and the control element of device 14. The current forced to flow in the control element of device 14 will switch the associated gate element into a resistive state thereby causing the current from current source 15 to flow through the gate element of device 13 and out the line identified as Output 1. The reset condition can be analyzed in a similar manner by considering a signal on the Reset Input line. Current in the control element of device 12 will switch the associated gate element into a resistive state, thereby causing current from current source 10 to flow in the path identified by the gate element of device 11 and control element of device 13. The current forced to flow in the control element of device 13 will switch the associated gate element into a resistive state thereby causing current from current source 15 to flow through the gate element of device 14 and out the Output 2 line. It can be seen, therefore, that a Set Input signal will produce an Output 2 signal, whereas a Reset Input will produce an Output 1 signal. Having determined the current distribution from source 10, the input signals can be removed and the distribution will be maintained by circuit inductance. Thus, the flip-flop exhibits memory.

In future discussions concerning the switching of a cryogenic device, it will be assumed that the gate element is switched from a superconductive state to a resistive state upon the passing of current in the associated control element. The control current will always be assumed to be of sufficient value for effecting the desired switching action in the gate element. Those situations requiring a different value of control current will be specifically pointed out and described.

Figure 3:
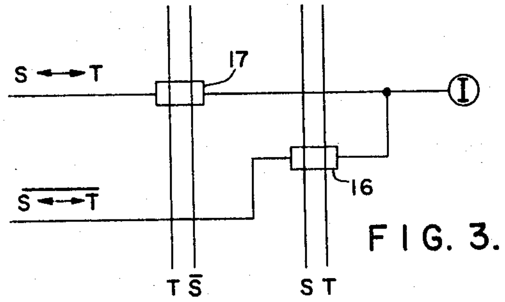
FIG. 3 is a schematic diagram of a dual control equivalence gate circuit.

Referring now to FIG. 3, there is shown a crossed film mechanization of an equivalence relationship between two equivalent variables S and T. Expressed symbolically as $S \leftrightarrow T$, the equivalence relationship is logically also equivalent to $ST+\bar{S}\bar{T}$. The circuit consists of two dual control devices 16 and 17 controlled by the currents in the two control elements associated with each device. The geometry of the two control elements is such that the associated gate element will be switched resistive if the control currents in the control elements are in the same direction, and, conversely, the gate element will remain superconductive if the control currents are in opposite directions. In the example chosen, device 16 is controlled by lines S and T, whereas gate 17 is controlled by lines $\bar{S}$ and T. The information is identified by means of the direction of the current on any line. For example, a binary 1 on both the T and S lines may be represented by current flowing in an upward direction along said lines, whereas a binary 0 may be represented by current flowing in a downward direction. $\bar{S}$ is the conventional symbolism used to indicate not S, or, in other words, the current in line $\bar{S}$ is always opposite to the current in line S. Using these conventions, it can be shown that device 16 will be resistive and device 17 superconductive if lines S and T both have a binary 1 or if both lines S and T have a binary 0. On the other hand, gate 17 will be resistive and gate 16 superconductive if line S has a binary 1 and line T has a binary 0, or if line S has a binary 0 and line T has a binary 1. The current from current source 18 will either flow through the gate element of device 17 and out the top line if device 16 is resistive and device 17 is superconductive, or the current will flow out the bottom line if device 16 is superconductive and device 17 is resistive. In other words, current will flow out the top line if, and only if, S and T are equivalent, expressed symbolically as $S \leftrightarrow T$. The bottom line, of course, is complementary which may be expressed as $\overline{S \leftrightarrow T}$.

Figure 4:
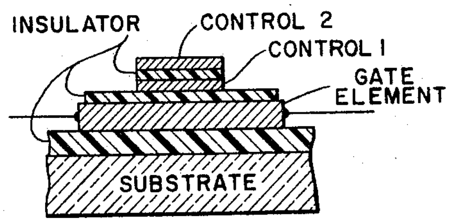
FIG. 4 is a cross sectional view of a dual control gate element illustrated in FIG. 3.

Referring now to FIG. 4, there is shown a cross section of a dual control device having two control elements, such as device 16 illustrated in FIG. 3. The device is usually built on a suitable substrate material that is covered by a thin film of insulating material. The gate element is bonded to the insulating material, and a second insulating film covers the gate element. The first control element is bonded on the insulator film and may be placed longitudinally or transversely with respect to the gate element. The first control element is covered by a third layer of a thin insulating film and the second control gate is bonded to said third layer of insulating material. Both the first and second control elements are placed in the same plane and are made as identical to each other as possible. When the currents in both control elements are in the same direction, the magnetic fields add and thereby switch the gate element from a superconductive state to a resistive state. The current levels in either of control elements 1 or 2 may be chosen so that either control element can switch the gate element, or, as in the example just described, the magnetic fields of both elements must combine to switch the gate element.

Figure 5:
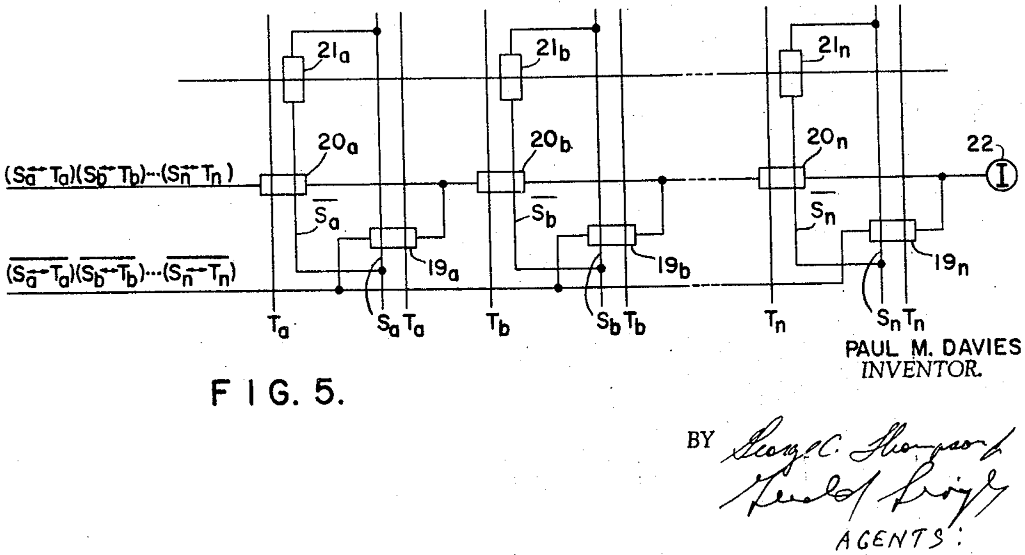
FIG. 5 is a schematic diagram of a number matching network.

Referring now to FIG. 5, there is shown a more detailed circuit illustrating the use of a number of equivalence gates, connected together to form a network whose output is described by the expression $$(S_a \leftrightarrow T_a)(S_b \leftrightarrow T_b) \ldots (S_n \leftrightarrow T_n)$$

This network is of some interest because it performs a matching operation between two numbers, one presented on the S lines, the other on the T lines. The output of the network is true only if both numbers are identical. If the numbers match, all of the gates of devices 19 and none of the gates of devices 20 are resistive so the current flows from source 22 and out the top line. A mismatch in any bit causes the gate element of device 20 to become resistive and the corresponding gate element of device 19 to become superconductive so the current is diverted to the bottom line. The modification illustrated in FIG. 2 shows lines S and $\overline{S}$ as branches of a persistor storing circuit. A persisting current in one direction signifies a binary zero and in the other direction a binary one. The gate elements of devices 21 are used to write into the persistor circuits in a manner that will be more fully described in connection with FIG. 8. The use of persistors is not necessary, however FIG. 2 illustrates how a number previously stored in the persistors can be compared with a new number transmitted along the T lines.

Figures 6, 7, 8, 9, 10:
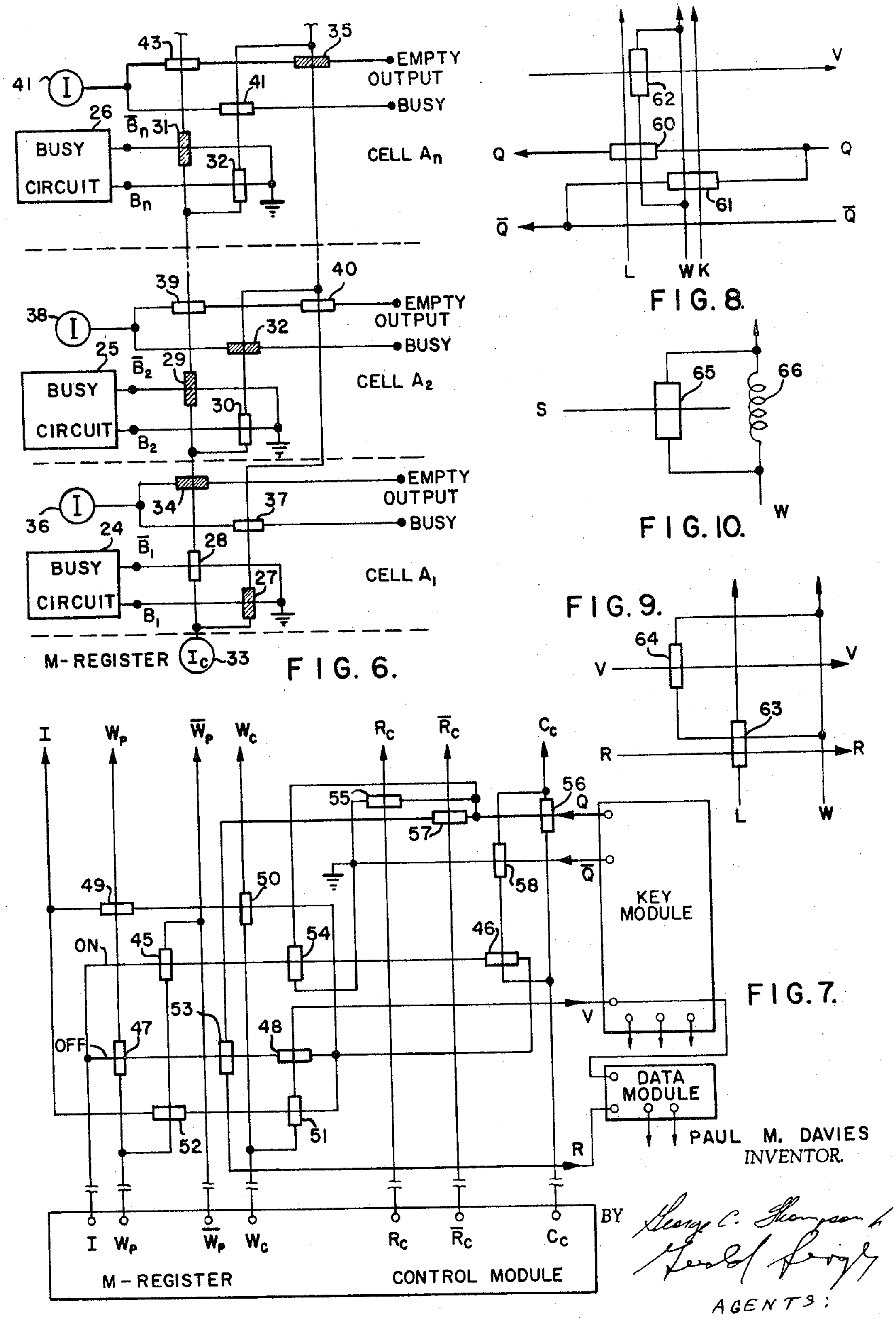
FIG. 6 is a schematic diagram of a switching network suitable for selecting the first available memory cell.
FIG. 7 is a schematic diagram of a control module illustrated in FIG. 1.
FIG. 8 is a schematic diagram of one bit of a key module illustrated in FIG. 1.
FIG. 9 is a schematic diagram of one bit of a data module illustrated in FIG. 1.
FIG. 10 is a second embodiment of one bit of a data module.

Referring now to FIG. 6, there is shown a simplified schematic diagram illustrating how the control signals from the M register seek out and identify the first empty cell in preparation to the writing of information. The first empty memory cell is identified as that available memory cell closest to the M register. For purposes of illustration, three control modules representing three individual memory cells $A_1$, $A_2$, and $A_n$, are shown. The selection of the first empty cell will be explained by assuming memory cell $A_1$ is full and that memory cells $A_2$ and $A_n$ are empty, which thereby identifies memory cell $A_2$ as the first empty cell. Associated with each control module of each memory cell are busy circuits 24, 25, and 26, each arranged to generate a signal on the $\overline{B}$ line if the individual memory cell is empty and hence available, or on the B line if the memory cell is full and hence unavailable. According to the original assumption, busy circuit 24 will generate a signal on the $B_1$ line thereby switching device 27 into the resistive state as indicated by the crosshatched lines, and leave device 28 which is in the $\overline{B}_1$ line superconductive. The busy circuit 25 will generate a signal on the $\overline{B}_2$ line, since it is available, and hence switch device 29 into a resistive state, leaving device 30 which is in the $B_2$ line superconductive. It will be observed that every busy circuit will generate a signal either on the B or $\overline{B}$ line depending on the availability of the memory cell. Similarly, busy circuit 26 will generate a signal on the $\overline{B}_n$ line, thereby switching device 31 resistive and leaving device 32 superconductive. The circuits as set up are tested by a current source 33 located in the M register preparatory to setting up additional circuits in each memory cell. The current from source 33 is fed to all memory cells and is selectively directed depending upon the individual outputs from each busy circuit. With the devices set up as indicated, current from the source 33 will prefer the path comprising the superconductive gate of device 28, the control element of device 34, the superconductive gate of device 30, the control element of device 32, and the control element of device 35 of the *n*th cell, after which the current is returned to the current source 33 to complete the current path. A reevaluation of the current path just traversed will show that the gate element of devices 34, 32, and 35 will switch into a resistive state. In memory cell $A_1$ a current source 36 feeds on output line labeled Empty which consists of device 34 and an output line labeled Busy which consists of device 37. Since device 34 is resistive and device 37 superconducting, an output signal will appear on the Busy line indicating that memory cell $A_1$ is not available. A similar analysis for memory cell $A_2$ will show that a path is available from a current source 38 and out the output line labeled Empty through the gate element of device 39 and through the gate element of device 40, thereby indicating that cell $A_2$ is the first available memory cell. Reviewing now the situation of cell $A_n$, which will be representative of all cells after the first available cell, it will be observed that current from a source 41 will flow out the Busy output line through the gate element of device 42, thereby indicating that the $A_n$th memory cell is not the first cell and hence not available. The current from source 41 will not flow out the Empty output line even though device 43 is superconductive due to the series device 35 being in a resistive state. It can be seen, therefore, that only one cell will be chosen as the first available cell ready to receive information and that the output signal from that particular cell is continuously being chosen and evaluated irrespective of the individual operation being performed elsewhere in the memory circuit.

Referring now to FIG. 7, there is shown a schematic diagram illustrating a control module contained in each memory cell. The uniqueness of the cryogenic device is the apparent infinite ratio existing between the resistive state and the superconductive state. This high ratio permits many inputs with practically no attenuation of signals. As a result, new and novel circuitry is possible which allows memory and logic functions to be easily combined with very low power requirements. The input lines identified as I, $W_p$, $\overline{W}_p$, $W_c$, $R_c$, $\overline{R}_c$, and $C_c$ all originate in the control module of the M register and sequentially connect all control modules of each memory cell. The I line supplies a current for use with a busy flip-flop circuit and an auxiliary flip-flop circuit located in each control module. The busy flip-flop selects the first available memory cell as explained in connection with FIG. 5.

The $W_p$ line carries prepare-to-write signal for seeking out and turning ON the auxiliary flip-flop circuit for the defined first memory cell. The circuit is of the type illustrated in FIG. 5 with the exception that the functions of devices 35 and 40 are performed in a different manner. The $\overline{W}_p$ line is actually a return line for the current signal appearing on the $W_p$ line. The $W_c$ line carries a write command signal for locating the first empty memory cell as set up and determined by the busy and auxiliary flip-flop circuits. In time sequence the write command signal on line $W_c$ follows the prepare-to-write signal on line $W_p$. If the control module under investigation is the defined first memory cell, then the write command signal becomes diverted to line V. The signal on line V is sent to the key and data modules of the associated memory cell and becomes the command to write signal for the data and key modules of the selected memory cell. The write command signal on line $W_c$ also sets the busy flip-flop circuit into an ON condition thereby indicating that this particular memory cell is full and not available. The $R_c$ line carries a read control signal used for controlling the read function of the data module. For other circuit reasons, which will be more apparent as the detailed description progresses, the read control circuit is divided into two branches, $R_c$ and $\overline{R}_c$. The read control signal is represented by current along the $R_c$ line, the complement by current along the $\overline{R}_c$ line. In connection with all operations of the control module not involving reading, a signal is sent on the $\overline{R}_c$ line; however, in connection with a reading operation, a read control sigal is generated on the $R_c$ line. As mentioned previously, the key modules contain a comparing circuit which is divided into two branches Q and $\overline{Q}$. The Q line carries a true comparing signal and the $\overline{Q}$ line carries a false comparing signal. The compared information is therefore always represented on either the Q line or the $\overline{Q}$ line. In operation, generation of a true compared signal on the Q line, together with the generation of a read control signal on the $R_c$ line, will result in a read command signal on the R line. The R line is directed to the data module of the particular memory cell for causing said data module to read the information into the M register.

It should be remembered in considering the disclosed system that information inserted in the M register is never directed to the location or identification of any particular memory cell, but rather to the identification of the stored record information itself. As mentioned previously, information is selected on the basis of unique portions of said information that identify the complete record, and this holds true for all operations of the disclosed memory. This important distinction is apparent in considering the clearing of previously stored information. A particular or preselected memory cell is not cleared per se, but rather information is cleared from that memory cell in which the information happens to be stored. Therefore, in order to clear information it is necessary that the information be compared in the key module and a comparing signal generated on either the Q line or the $\overline{Q}$ line. Upon the occurrence of a signal on the Q line and a clear control command signal on the $C_c$ line, the busy flip-flop in the control module will be turned OFF, thereby making the complete memory cell available for new information. In all operations not involving a reading operation, a signal must be sent on line $\overline{R}_c$. It is important, therefore, when generating a clear control command signal on the line $C_c$ to also generate a signal on the $\overline{R}_c$ line. The clearing operation takes place completely within the control module and consists simply of turning OFF the busy flip-flop circuit.

The busy flip-flop is defined by devices 45, 46, 47, and 48, and the auxiliary flip-flop is defined by devices 49, 50, 51, and 52. If the memory cell is empty the busy flip-flop is OFF, and the OFF path consists of devices 45 and 46. If the memory cell is full the busy flip-flop is ON, and the ON path consists of devices 47 and 48. With respect to the auxiliary flip-flop, there are two paths available which include devices 49 and 50, or devices 51 and 52. The operation of the control module is now best explained by assuming that the particular memory cell is empty and that it is the defined first memory cell. This initial assumption will illustrate the write function of both the key module and data module. In accordance with the assumption as set forth, current will flow from line I through the OFF path of the busy flip-flop consisting of the control element of device 47, the control element of device 53, and the gate element of device 48, and that half of the auxiliary flip-flop circuit consisting of the control element of device 50 and the gate element of device 49. This path will switch devices 47, 53, and 50 into a resistive state. Switching of device 53 into a resistive state prevents a read command signal from being sent on line R when the busy flip-flop is OFF. If we assume now that information has been placed in both the key module and data module of the M register preparatory to being written into the first memory cell, we are now ready to generate a prepare-to-write signal on the $W_p$ line. The signal on the $W_p$ line is prohibited from entering the gate element of device 47, since said device is now resistive. The signal on line $W_p$ flows through the control element of device 52 and the gate element of device 45 and out the $\overline{W}_p$ line, the first step in selecting the defined first memory cell has occurred. The complete path for the current on line I now includes the control element of device 47, the control element of device 53, the gate element of device 48, the control element of device 50, the gate element of device 49 and out the line I into the next memory cell. In time sequence, a write command signal is generated on line $W_c$ and directed to all memory cells. This signal is diverted to the V line in the defined first memory cell and then to the key and data modules of said memory cell. This is accomplished by the auxiliary flip-flop being in the ON condition as evidenced by device 50 being resistive. The write command signal on line $W_c$ is prohibited from passing through the gate element of device 50 and is thereby forced to take the alternate path consisting of the gate element of device 51, the control element of device 48, and out line V to the associated key and data modules. The switching of element 48 sets the busy flip-flop into the ON condition which indicates the memory cell is now full. The current path from line I now comprises the ON path of the busy flip-flop, which includes the control element of device 45, the control element of device 54, the gate element of device 46, and through the auxiliary flip-flop, which includes the path of the control element of device 50 and the gate element of device 49. The current path just defined results in devices 45 and 54 being switched resistive and devices 47 and 53 becoming superconductive. A subsequent prepare-to-write signal on line $W_p$ will pass through the gate element of device 47 and the control element of device 49, since device 45 is now resistive. The effect of this new current path allows device 52 to become superconductive and causes device 49 to become resistive. The switching of device 49 affects the auxiliary flip-flop circuit in that current is now forced to take the alternate path consisting of the control element of device 51 and the gate element of device 52. The complete path of current from line I now includes the control element of device 45, the control element of device 54, the gate element of device 46, the control element of device 51, and the gate element of device 52. The effect of this switch in auxiliary flip-flop results in device 50 becoming superconductive and device 51 becoming resistive. Considering now a subsequent write command signal originating on the $W_c$ line, it will be apparent that such a signal will simply pass through the gate element of device 50 and out into the next memory cell.

The busy flip-flop and the auxiliary flip-flop circuits are now in their proper condition to consider a read operation in which information stored in the data module is read into the data module of the M register. As mentioned previously, a true comparison between information in the key module of the M register and information stored in the key module of the memory cell will result in a comparing signal on the Q line. As mentioned previously, in all control operations involving the $W_p$, $W_c$, or $C_c$ lines, a signal is generated on the $\overline{R}_c$ line. For example, if the control involves a reading of information, then a pulse is generated on the $R_c$ line. However, for any other operation, a corresponding signal is generated on the $\overline{R}_c$ line. For the reading operation, a read control signal is generated on the $R_c$ line and passed through the control element of device 55, thereby switching said device into a resistive state. Having assumed a true comparison in the key module, a comparing signal on the Q line will be generated and passed through the control element of device 56, the gate element of device 57, the gate element of device 53, and out the R line into the data module. The comparing signal on line Q switched device 56 into a resistive state. It will also be observed that the alternate paths were blocked by the resistive condition of devices 55 and 54. Device 53 is located in the busy flip-flop circuit as a protection against having a read command signal being generated from a chance comparison in the key modules when the busy flip-flop is OFF and indicated to be in an empty or available condition.

Another basic operation performed by the control module is the process of clearing a full memory cell. As mentioned previously, clearing is achieved by simply turning OFF the busy flip-flop. In preparation for a clear control command signal, the key module will generate a comparing signal on the Q line. In the absence of any control signals and considering the busy flip-flop to be ON, the current on line Q will pass through the control element of device 56 and the gate element of device 55 to ground, which represents a return path for the comparing signal source. The comparing signal is prohibited from taking any of the alternate paths due to the resistive states of device 57 and device 54. A clear control command signal is generated on line $C_c$, and since device 56 is resistive the current path will include the control element of device 46 and the gate element of device 58. A clear control command signal will therefore switch device 46 resistive, and since device 46 is in the ON path of the busy flip-flop it will be apparent that the busy flip-flop will be switched into the OFF state. The path of current on line I will flow through the control element of device 47, the control element of device 53, the gate element of device 48, the control element of device 51, and the gate element of device 52. This defined path results in devices 47 and 53 being switched resistive and devices 45 and 54 being switched superconductive. The situation of the particular gates in the busy flip-flop and auxiliary flip-flop are now in the original state that was assumed for determining the defined first empty memory cell. In considering the clearing operation, it will be appreciated that if the particular cell did not contain the information to be cleared, then the comparing signal from the key module would appear on the $\overline{Q}$ line and would pass through the control element of device 58 and then to ground. In this situation, device 58 would be switched into a resistive state, whereas device 56 would remain superconductive. In this situation a clear control command signal on line $C_c$ would pass through the gate element of device 56 and into the next memory cell having a comparing signal on the Q line.

Referring now to FIG. 8, there is illustrated a key module arranged to handle a single bit of information. The vertical lines L, W, and K originate in the M register and feed similarly located key modules in each memory cell. The L and K lines carry interrogating signals and the W line carries an informational signal. The V line is connected to all bits of the same key module and is adapted to receive the write command signal from the control module. Both the Q line and $\overline{Q}$ line are sequentially connected to each bit comprising the key module. The highest order bit is connected to the input of the control module as illustrated in FIG. 7. The comparing circuit of the key module is basically an equivalence circuit consisting of devices 60 and 61 and a persister circuit driven by current on line W and controlled by device 62. The informational current is fed on line W in the form of a current pulse, the direction of which represents the information in the binary form. For example, it can be assumed that current moving up line W will represent a binary 1 and current moving down line W will represent a binary 0. The key module is best understood by assuming a situation in which a bit of information is to be written. As explained in connection with FIG. 7, the control module will direct the write command signal on line $W_c$ into the V line which is directed to all bits comprising the key module. A current on line V passes through the control element of device 62 thereby switching said device 62 into a resistive state. It will be remembered that line V is connected to every bit in the key module and will therefore switch every associated device into a resistive state.

In considering how the informational current signal on line W is stored in the selected key module, it is thought best to first consider the basic properties making up a persistor circuit. The explanation will be more readily understandable if we consider that portion of line W in parallel with the gate element of device 62 to contain more inductance than the parallel gate element. The informational current signal on line W will initially prefer the gate path of device 62, since it is of lower inductance than line W. The gate element of device 62 having been switched into a resistive state by a signal on line V will introduce an IR drop which will cause current to transfer to the other branch of the persistor. Eventually, therefore, the complete informational current will flow through the higher inductance path in line W and completely bypass the parallel gate element of device 62. It must be remembered that in all other key modules the gate corresponding to device 62 will be superconducting, and hence the current path will flow through the low inductance path of the gate circuit and bypass the higher inductance path on line W. The informational current is stored by first removing the write command signal on line V and then removing the informational current signal on line W. When the current in line W is removed, a voltage develops across the nodes of the persistor which causes a redistribution of the current in the two parallel paths which make up the persistor. The current in the highly inductive path will tend to remain constant. The current in the other path will change in such a way as to cause a total current of zero in line W. The result will be a persisting circulating current in the persistor loop. Its direction will be counterclockwise to represent a 1 and clockwise to represent a 0, as determined by the direction of the original informational current in line W. The absolute value of the informational current on line W is chosen to produce a circulating current in the persistor of approximately two-thirds the critical control current value necessary to switch the gate element of a device from a superconductive to a resistive state. Since the circulating current is less than the necessary current value needed to switch a given device, there will be no switching effect on either device 60 or 61. In considering the action of this particular persistor circuit, the inductance values and relationships were selected for ease of explanation, since it is well known that persistor circuits with equal or other relationships of inductance may be used.

Another function of the key module is to compare stored information with information transmitted from the key module of the M register preparatory to generating a read command signal or a clear command signal. The comparing operation is accomplished by placing information in the key module of the M register and transmitting this information in the form of single bits of informational current on the L and K lines associated with each bit. The individual current levels are so chosen that the current levels for each L and K line are made equal to two-thirds the critical control current value necessary to switch a device. The direction of the current signals on lines L and K determines the value of the transmitted bit. In this example, we represent binary 1 by current up along L and K and binary 0 by current down along L and K. The currents on lines L and K will be in the upward direction and have a value of two-thirds the critical control current value necessary to switch a gate element. Line L passes through a second control element of device 60 and carries a current in an upward direction which by itself would not be sufficient to switch said device 60. The stored circulating current in device 62 being a binary 1 value is circulating in a counterclockwise direction and, as mentioned previously, has a value equal to two-thirds the critical switching value. Since the currents through the control elements of device 60 are in opposing directions, the magnetic fields generated by the control elements will also be in opposing directions and hence the resultant field will be 0. Similarly, the current in line K will not by itself be sufficient to switch device 61. However, the counterclockwise circulating current through the gate element of device 62 passes through the first control element of device 61 in the same direction as the current in line K and they together exceed the critical value necessary to switch said device. Similarly, the combined effect of a transmitted and a stored zero would be to make gate 61 resistive and gate 60 superconductive. On the other hand, if the transmitted and stored bits differ, the currents combine to make gate 60 resistive and gate 61 superconductive. A comparing circuit is therefore established in which device 60 is superconductive and device 61 is resistive when the bit of information stored in that key module is identical with the information being read from the M register. The output for a true comparison will therefore be on the Q line. For those key modules that do not compare, device 60 will be resistive and device 61 superconductive, thereby diverting the comparing current signal to the $\overline{Q}$ line, indicating that a true comparison was not made. The comparing operation in the key module takes place continuously and as a result a comparing signal is continuously being generated on either the Q or $\overline{Q}$ line. This feaure is an advantage in most instance, however, it is conceivable that in one instance it may be a disadvantage. This one instance may occur after a memory cell has been cleared which as explained in connection with FIG. 6 was achieved by simply turning the busy flip-flop into the OFF condition. Since the key information in the key module is still circulating, it is possible that a comparing signal on the Q line may be generated. Since in fact this is not a true comparison, it is prohibited from becoming a write command signal by device 53 and it is bypassed to ground by device 54, both of which are in the control module as shown in FIG. 7.

In certain applications where less than the total key information is needed to uniquely identify the record, it is necessary to mask the unused columns of the key information. The key position is masked by transmitting a masking signal from the key module of the M register on the K line of the particular column being masked. The masking signal is at least twice the critical value thereby insuring that device 61 and all similar devices on the K line will switch resistive irrespective of the direction of the circulating current. The comparing circuit is therefore placed in a true comparing condition in which device 60 is superconductive and device 61 is resistive.

Referring now to FIG. 9, there is shown a portion of a data module for handling a single bit of information and consisting of elements 63 and 64. As mentioned previously, the data module receives, stores, and reads out the stored information. The data module does not compare information as is done in the key module but has the ability to read out the stored information which the key module cannot do. The storing portion of the data module is similar to the key module in that a persistor circuit is used. The operation of the data module will be best understood by considering a write operation in which informational current having approximately two-thirds the critical switching value is sent from the M register along line W, and a write command signal is generated in the control module and sent along line V. The current in line V passes through the control element of device 64, thereby switching said device, and diverting the current to the branch of line W in parallel with the gate element of device 64. The informational current is stored by first terminating the command signal on line V so as to make device 64 superconductive and then terminate the current on line W. This sequence of switching will store the informational current as a circulating current in the path consisting of the gate element of device 64 and that portion of line W connected in parallel with said gate element. The stored circulating current in the first control element is only two-thirds the critical value and hence will not affect device 63. The read operation occurs when a read command signal of two-thirds the critical value is generated in the control module and appears on the R line. Device 63 is of the type having two separate control elements, each capable of switching the associated gate element. Assuming that a binary 1 has been stored in the form of a circulating current and in keeping with the previous convention that a binary 1 current will circulate in a counterclockwise direction, it will be apparent that the fields generated by the circulating current and the read command signal will switch the gate element of device 63 into a resistive state. An interrogating pulse is then sent from the data module of the M register along line L. Since the gate element of device 63 is now resistive, a voltage will be developed across said gate element which will be detected by a suitable amplifier in the M register and read as a binary 1 in the data module of said M register. Assuming now that the stored value is a binary 0, which by definition means the current is being circulated in a clockwise direction, it will be apparent that the fields generated by the first and second control elements of device 63 will be opposing each other and therefore said gate element will remain superconductive. An interrogating pulse generated on line L will therefore not sense any voltage which is interpreted by the read amplifier in the data module of the M register as a binary 0. An immediate advantage of this circuit is that it permits nondestructive reading, since the circulating current passing through the gate of device 64 has not been distinguished nor altered in any way.

Referring now to FIG. 10, there is shown an alternate circuit useful as a data module. This circuit utilizes a single device 65 and is generally known as a gated persistor. A single line S passes through all control elements of each bit associated with the data module. Line S carries both the read command pulses and the write command pulses that are generated in the control module but of course at the proper times. Writing information into the persistor is achieved by transmitting a write command signal along line S which has the effect of switching the gate element of device 65 from a superconductive to a resistive state. In time sequence, informational current is applied to line W in a direction depending on the sense of the information, that is, for example, up line W for a binary 1 or down line W for a binary 0. The currents in lines S and W are turned OFF in the sequence named to thereby induce a circulating current through the gate element of device 65 and inductance 66 in line W. The read operation is achieved by generating a read command signal on line S which causes the gate element of device 65 to become resistive, thereby developing a voltage due to the circulating current, which is thereby detected in direction by means of a sense-detecting amplifier in the data module of the M register. The disadvantage of this system is that the reading operation destroys the stored information, which is sometimes called destructive reading. However, the circuit is substantially simplified by having only a single line for carrying both the write and read command signals and a single gate element. Since the same signal on line S may be used for both writing and reading, it is possible to impulse line S to read information, and then as soon as the output on line W has been detected in the M register to transmit an identical informational signal along line W. By first turning off the signal on line S and then the informational current on line W, it is possible to re-record the information. This technique is actually a destructive reading followed by a subsequent writing operation, which may have certain advantages over that illustrated in FIG. 9.

Figure 11:
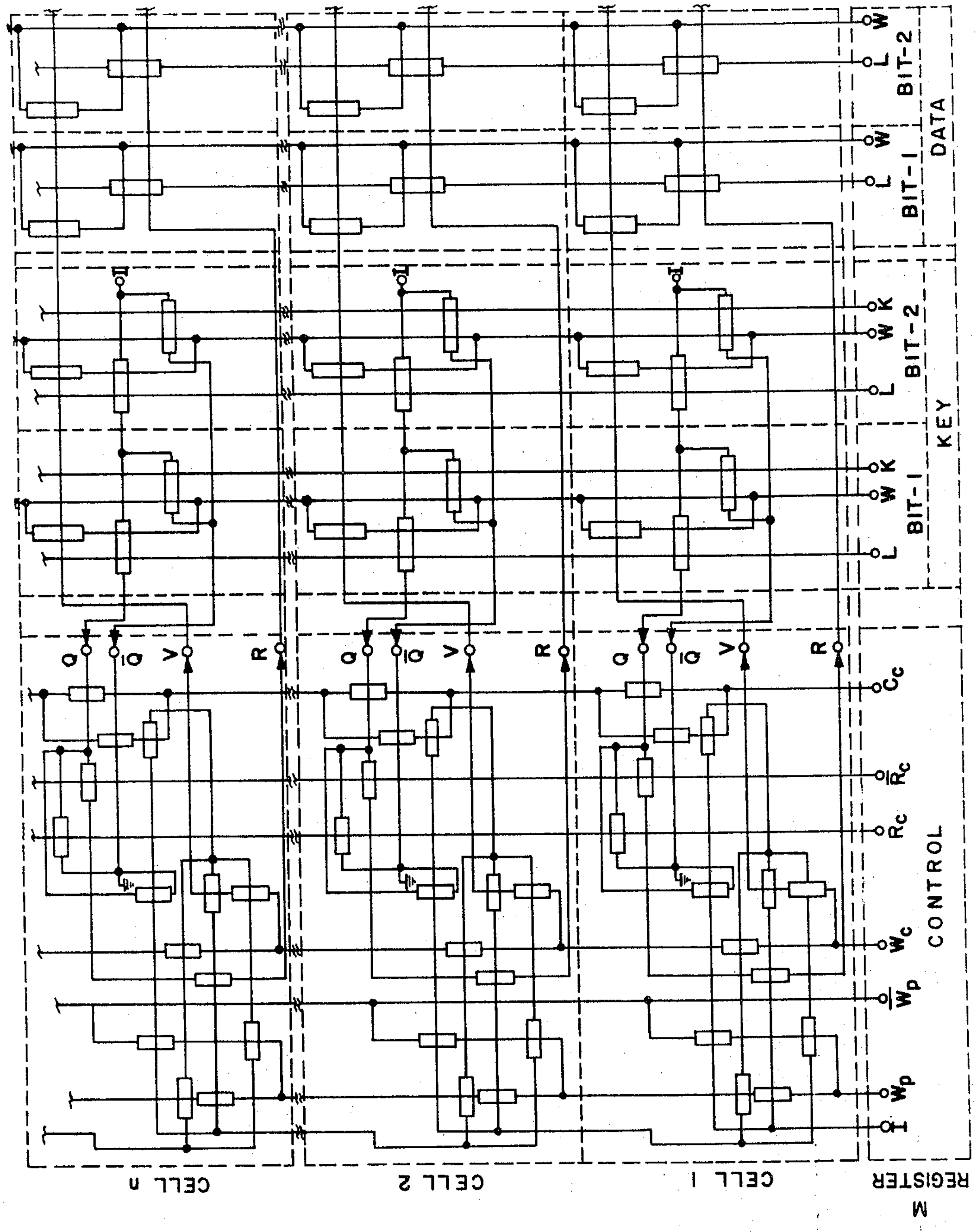
FIG. 11 is a schematic diagram of a memory storage device illustrated in FIG. 1 and utilizing the control module of FIG. 6, the key module of FIG. 8, and the data module of FIG. 9.

Referring now to FIG. 11, there is illustrated a complete memory system comprised of a key module having a capacity of two bits and a data module having a capacity of two bits. The control module of the M register contains the means for generating the signals being fed on the $W_p$, $W_c$, $R_c$, and $C_c$ lines. These lines are all directed in a vertical fashion through all of the associated control modules of each memory cell identified as cell 1, cell 2, and cell *n*. The individual lines after cell *n* are simply returned to the control module of the M register and serve to complete the return paths. The key module for the M register contains the necessary means for receiving information and generating the necessary interrogating pulses on line L and K and informational signals for lines W. The data modules of the M register contain the means for generating the informational signals on line W and the sensing read amplifiers necessary to detect the sense or direction of the read voltage. It will be noted that each bit of information in both the data and key modules is completely independent and separate in operation. Each control module for each memory cell is identical to that illustrated in connection with FIG. 7. The key module of each memory cell comprises a plurality of individual bit handling circuits identical to that illustrated in connection with FIG. 8. The data modules are comprised of a plurality of bit handling components each identical to that illustrated in connection with FIG. 9 and again the total number of bits being determined only by the capacity of the record being stored. In connection with bit 2 of each of the key modules associated with each memory cell there is identified a current source labeled I which supplies the necessary current for producing the Q comparing signals. In actual practice only a single current source would be used, but for clarity and understanding the basic circuit, individual current sources are illustrated.

This completes the description of the embodiments of the invention disclosed and illustrated herein. However, many modifications and advantages will be apparent to persons skilled in the art without departing from the spirit and scope of this invention. For example, the interrogating lines identified as L and K in all key modules may actually be a single line carrying a single interrogating current signal, provided only that the single line traverse the individual devices in the same direction and manner as illustrated for both lines L and K. It will be appreciated that two lines allowed a simple and direct explanation for the associated comparing circuits in each key module. Accordingly, it is desired that this invention not be limited to the particular details of the embodiments disclosed herein except as defined in the appended claims.

What is claimed is:

1. A memory system comprising a plurality of memory cells each arranged to store a complete record, transmitting means for transmitting bits of information simultaneously to all first portions of all the memory cells, each transmitted bit of information being directed to corresponding bit positions in each memory cell, means for inhibiting the transmission of selected bits of information to said first position of said memory cells, comparing means in said first portion of each memory cell for comparing said corresponding stored bits of information, and selecting means in each memory cell responsive to said comparing means for selecting said record in the presence of a perfect match indicated by said comparing means.

2. A memory system comprising a plurality of memory cells, a plurality of bit positions in each memory cell for storing a complete record, each memory cell having a first portion and a second portion, transmitting means for transmitting bits of information simultaneously to all first portions of all the memory cells, each transmitted bit of information being directed to corresponding bit positions in each memory cell, means for inhibiting the transmission of selected bits of information to said first position of said memory cells, comparing means in said first portion of each memory cell for comparing said corresponding stored bits of information, said transmitted information being sufficient to uniquely identify a stored record, and selecting means in each memory cell responsive to said comparing means for selecting said record in the presence of a perfect match indicated by said comparing means.

3. A self searching memory comprising a plurality of cells, each cell comprising memory means for storing a single complete record, and logic means for controlling the writing, reading, and clearing of said record, means for transmitting control signals to all logic means, and means for transmitting record information to all memory means, said control signals and said record information being transmitted simultaneously, said logic means in each cell cooperating with said control signals for selecting the first empty cell and storing said record in said selected cell.

4. A self searching memory comprising a plurality of cells, each cell comprising memory means for storing a single complete record, and logic means for controlling the writing, reading, and clearing of said record, and means for transmitting control signals and record information simultaneously to all cells, said logic means in each cell cooperating with said control signals for selecting the first empty cell and storing said record in said selected cell.

5. A self searching memory comprising a plurality of cells, each cell comprising memory means for storing a single complete record, and logic means for controlling the writing, reading, and clearing of said record, said memory means having a first portion and a second portion, said first portion arranged to store part of the total record sufficient to uniquely identify said total record, means for transmitting control signals to all logic means, means for transmitting record information to said first and second portions comprising said memory means, said control signals and said record information being transmitted simultaneously, said logic means in each cell cooperating with said control signals for selecting the first empty cell and storing said record in said selected cell.

6. A memory cell comprising, a data section comprising a plurality of individual data modules each arranged to write, store, and read a single bit of record information, each of said data modules comprising a controlled cryogenic persistor circuit adapted to store a bit of information as a circulating current, the direction of said circulating current representing information in the binary form, a key section comprising a plurality of individual key modules each arranged to write, store, and compare stored bits of record information with external interrogating signals for identifying a stored record, each of said key modules comprising a cryogenic persistor circuit for writing and storing said unique number of bits as a circulating current, the direction of said circulating current representing information in the binary form, and a cryogenic matching network for comparing said interrogating signals with said stored unique number of bits to thereby identify said complete record, and a control section responsive to said matching network and adapted to receive operational signals for controlling said data module.

References Cited by the Examiner

UNITED STATES PATENTS

| | | | |
|---|---|---|---|
| 3,031,650 | 4/1962 | Koerner | 340—173 |
| 3,099,819 | 7/1963 | Barnes | 340—172.5 |
| 3,221,157 | 11/1965 | Fleisher | 340—173 |

FOREIGN PATENTS

| | | |
|---|---|---|
| 634,051 | 1/1962 | Canada. |

OTHER REFERENCES

"A Cryotron Catalog Memory System," (A. E. Slade and H. O. McMahon) Proceedings of the Eastern Joint Computer Conference, December 10–12, 1956, published June 1957.

BERNARD KONICK, *Primary Examiner.*

JAMES W. MOFFITT, MALCOLM A. MORRISON, *Examiners.*

T. W. FEARS, P. L. BERGER, *Assistant Examiners.*